(12) United States Patent
Watanabe et al.

(10) Patent No.: US 11,632,482 B1
(45) Date of Patent: Apr. 18, 2023

(54) INFORMATION PROCESSING SYSTEM CAPABLE OF ENABLING COOPERATION OF PROCESSING WHEN CONNECTION WITH EXTERNAL APPARATUS BEING DISCONNECTED, INFORMATION PROCESSING APPARATUS THEREFOR, AND NON-TRANSITORY COMPUTER READABLE MEDIUM STORING PROGRAM THEREFOR

(71) Applicant: FUJIFILM Business Innovation Corp., Tokyo (JP)

(72) Inventors: Satoshi Watanabe, Kanagawa (JP); Masato Sugii, Kanagawa (JP); Hiroshige Nonaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/577,339

(22) Filed: Jan. 17, 2022

(30) Foreign Application Priority Data

Sep. 27, 2021 (JP) .............................. JP2021-156404

(51) Int. Cl.
*H04N 1/00* (2006.01)
*H04N 1/32* (2006.01)

(52) U.S. Cl.
CPC ..... *H04N 1/00954* (2013.01); *H04N 1/00214* (2013.01); *H04N 1/00244* (2013.01); *H04N 1/32496* (2013.01)

(58) Field of Classification Search
CPC .......... H04N 1/00954; H04N 1/00214; H04N 1/00244; H04N 1/32496
See application file for complete search history.

(56) References Cited

U.S. PATENT DOCUMENTS 8,169,639 B2 * 5/2012 Aoki ................. H04N 1/00244
399/9
10,015,356 B2 7/2018 Hori
(Continued)

FOREIGN PATENT DOCUMENTS

| EP | 3123411 | 9/2020 |
| JP | 2015060247 | 3/2015 |
| JP | 6264800 | 1/2018 |

OTHER PUBLICATIONS

"Search Report of Europe Counterpart Application", dated Aug. 19, 2022, p. 1-p. 10.

*Primary Examiner* — Juan M Guillermety
(74) *Attorney, Agent, or Firm* — JCIPRNET

(57) ABSTRACT

An information processing apparatus includes a processor configured to perform connection to an external server that can be connected from the information processing apparatus and instruct the external server to execute processing as a first job, and then release a resource used in the first job, make an inquiry about whether or not the processing is completed to the external server, and wait for a response from the external server, in a case where a response indicating that the processing by the external server is completed is received in response to the inquiry, execute a second job that is different from the first job and is cooperated with the first job, and, in a case where a connection between the information processing apparatus and the external server is disconnected before or during the execution of the second job, make an inquiry about whether or not the processing is completed to the external server again and wait for a response from the external server.

16 Claims, 11 Drawing Sheets

(56) References Cited

U.S. PATENT DOCUMENTS

| | | |
|---|---|---|
| 2006/0195508 A1 | 8/2006 | Bernardin et al. |
| 2009/0172084 A1 | 7/2009 | Lavanya et al. |
| 2016/0065764 A1* | 3/2016 | Kang .................... G06F 3/0484 358/1.13 |
| 2016/0275123 A1* | 9/2016 | Lin ....................... G06F 9/5083 |
| 2019/0272135 A1* | 9/2019 | Nakamura ............ G06F 3/1263 |

* cited by examiner

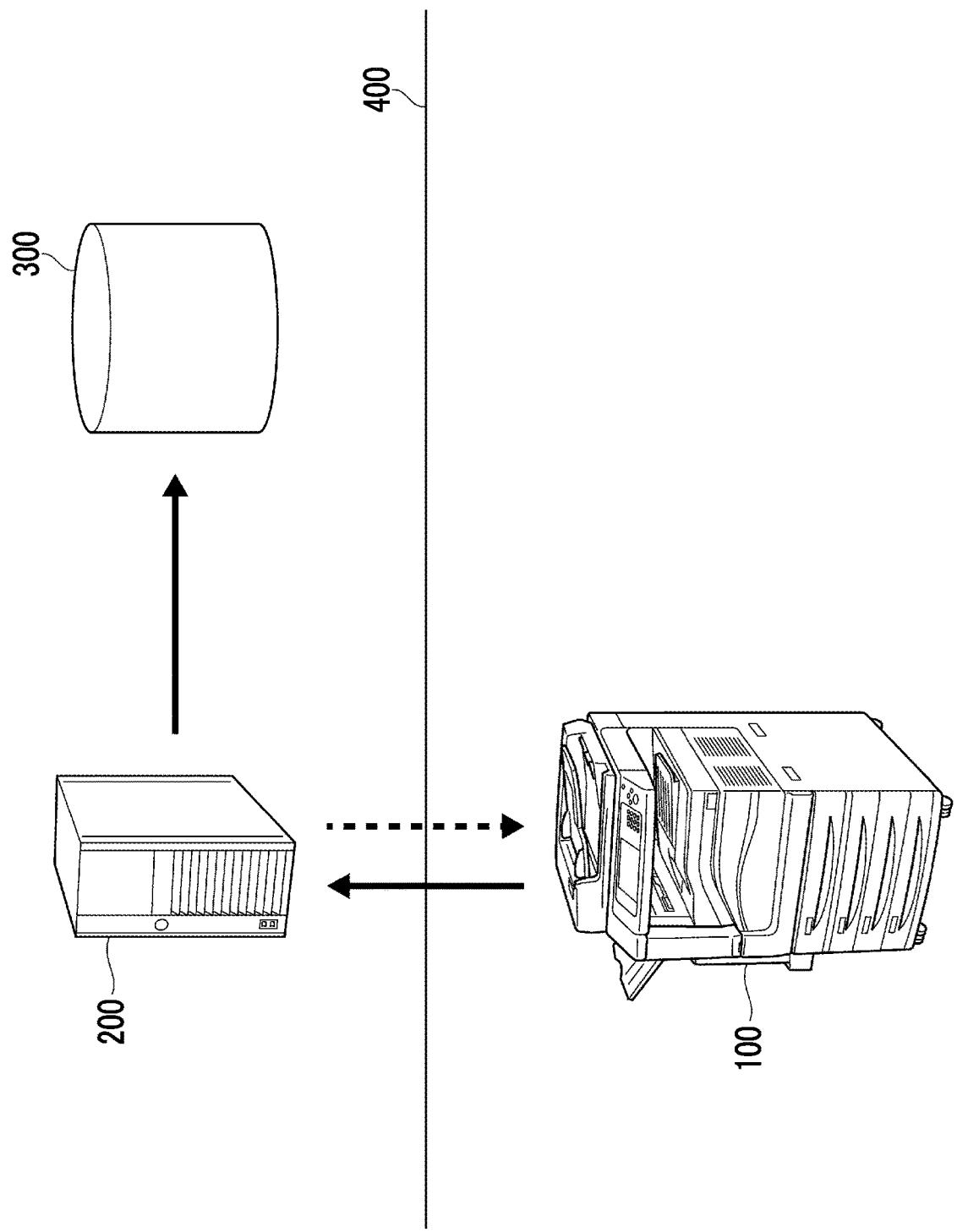

US 11,632,482 B1

INFORMATION PROCESSING SYSTEM CAPABLE OF ENABLING COOPERATION OF PROCESSING WHEN CONNECTION WITH EXTERNAL APPARATUS BEING DISCONNECTED, INFORMATION PROCESSING APPARATUS THEREFOR, AND NON-TRANSITORY COMPUTER READABLE MEDIUM STORING PROGRAM THEREFOR

CROSS-REFERENCE TO RELATED APPLICATIONS

This application is based on and claims priority under 35 USC 119 from Japanese Patent Application No. 2021-156404 filed Sep. 27, 2021.

BACKGROUND

(i) Technical Field

The present invention relates to an information processing system, an information processing apparatus, and non-transitory computer readable medium storing a program.

(ii) Related Art

In data processing by an information processing apparatus, a part of the processing in one job may be executed by an external apparatus. In this case, for example, the processing is executed while exchanging data and a processing result between the apparatuses according to individual processing included in the job and a workflow in which an execution subject of each processing is defined.

JP6264800B discloses an information processing system in which workflow information that defines the order of a plurality of processing and the information processing apparatus that is an execution subject of each of the plurality of processing defines one information processing apparatus selected from a plurality of information processing apparatuses as the execution subject, each of the plurality of processing defined in the execution subject and defined in the workflow information is executed by the information processing apparatus defined as the execution subject in the defined order, and processing, in which the execution subject in the workflow information is one information processing apparatus selected among the plurality of information processing apparatuses, is executed by the one information processing apparatus selected according to a predetermined determination condition.

SUMMARY

In a case where a part of processing in one job executed by an information processing apparatus is executed by an external apparatus, the job related to the processing is retained in the information processing apparatus until the processing by the external apparatus ends, so that a resource, such as a memory is wasted. Therefore, it is conceivable that, among operations of the information processing apparatus, an operation before the processing by the external apparatus is started and an operation after the processing by the external apparatus ends are executed as different jobs, and the resource is released after executing a previous job. However, in a case where a connection between the information processing apparatus and the external apparatus is disconnected after executing the previous job, cooperation between the previous job and a later job may be broken.

Aspects of non-limiting embodiments of the present disclosure relate to an information processing system, an information processing apparatus, and non-transitory computer readable medium storing a program that enable cooperation of processing to be restored even in a case where a connection with an external apparatus is temporarily disconnected in a case where a part of a series of processing is executed by the external apparatus in an information processing apparatus, as compared with a configuration in which previous and later operations of the processing to be executed by the external apparatus are executed as different jobs.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: perform connection to an external server that can be connected from the information processing apparatus and instruct the external server to execute processing as a first job, and then release a resource used in the first job; make an inquiry about whether or not the processing is completed to the external server, and wait for a response from the external server; in a case where a response indicating that the processing by the external server is completed is received in response to the inquiry, execute a second job that is different from the first job and is cooperated with the first job; and in a case where a connection between the information processing apparatus and the external server is disconnected before or during the execution of the second job, make an inquiry about whether or not the processing is completed to the external server again and wait for a response from the external server.

BRIEF DESCRIPTION OF THE DRAWINGS

Exemplary embodiment(s) of the present invention will be described in detail based on the following figures, wherein:

FIG. 11 is a diagram showing a second modification example of the information processing system according to the present exemplary embodiment.

DETAILED DESCRIPTION

Hereinafter, an exemplary embodiment of the present invention will be described in detail with reference to the accompanying drawings.

System Configuration

Figure 1:
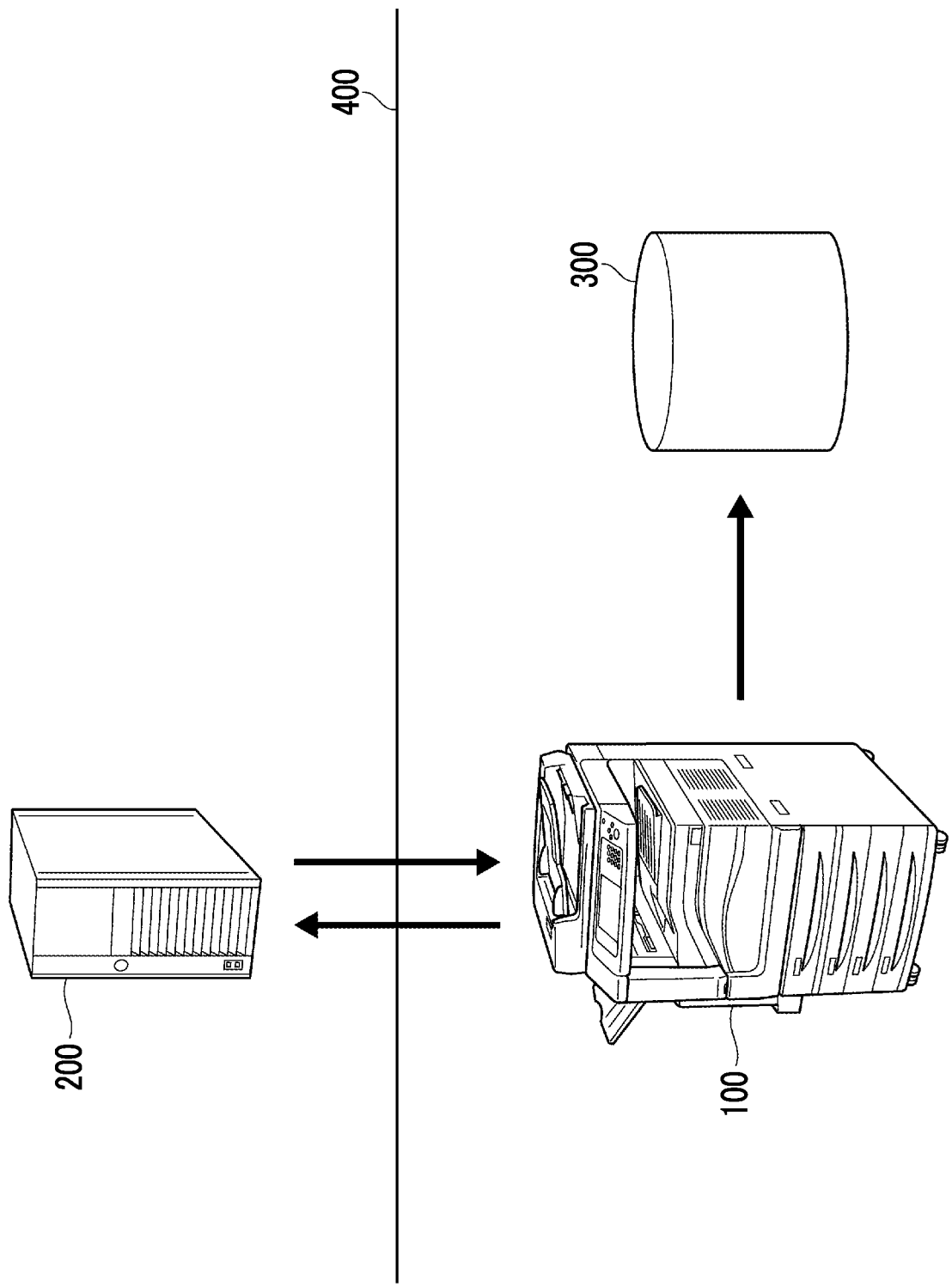
FIG. 1 is a diagram showing an overall configuration of an information processing system according to the present exemplary embodiment.

FIG. 1 is a diagram showing an overall configuration of an information processing system according to the present exemplary embodiment. The information processing system of the present exemplary embodiment includes an information processing apparatus 100, a processing execution server 200, and a management server 300. The information processing apparatus 100 is an apparatus that executes data processing. The information processing apparatus 100 may include, in addition to a personal computer, various apparatuses that can be connected to the processing execution server 200 and the management server 300, which are external apparatuses, via a function of processing data and a network.

The processing execution server 200 is a server that acquires data from the information processing apparatus 100 to execute processing. The processing execution server 200 is a server provided over the network, may be configured as a single server machine, or may be realized by a virtual server or a cloud server that realizes a function as the processing execution server 200 by a plurality of servers. The processing execution server 200 is an example of an external server. The management server 300 is a storage server that stores and manages data. The management server 300 stores data of processing results by the information processing apparatus 100 and the processing execution server 200. The management server 300 is an example of the external apparatus.

The information processing apparatus 100, the processing execution server 200, and the management server 300 are connected via the network. In the configuration shown in FIG. 1, a firewall 400 is set between the information processing apparatus 100, the management server 300, and the processing execution server 200, and the information processing apparatus 100 and the management server 300 are protected by the firewall 400. Therefore, the information processing apparatus 100 can access the processing execution server 200 but the processing execution server 200 cannot access the information processing apparatus 100 and cannot access the management server 300 over the firewall 400.

As described above, the information processing apparatus 100 may be realized using various apparatuses that perform data processing. As an example, a case is considered where the information processing apparatus 100 is realized by an image processing apparatus. Hereinafter, the image processing apparatus as the information processing apparatus 100 will be described as an "image processing apparatus 100" with a reference numeral of the information processing apparatus 100. In the system shown in FIG. 1, the image processing apparatus 100 requests the processing execution server 200 to perform a part of processing for data such as an image to be processed. The processing execution server 200 performs processing for the image acquired from the image processing apparatus 100. Then, in a case where the processing execution server 200 accepts the request from the image processing apparatus 100, the processing execution server 200 returns a processing result for the image to the image processing apparatus 100. The image processing apparatus 100 sends data of the processing result acquired from the processing execution server 200 to the management server 300.

A specific example of an aspect, in which the image processing apparatus 100 and the processing execution server 200 are used, is considered. For example, the image processing apparatus 100 reads an image of a form such as an invoice or a receipt, and requests the processing execution server 200 to analyze the image of the form. Further, the image processing apparatus 100 may acquire electronic data of the form and request the processing execution server 200 to analyze the form based on the electronic data. Hereinafter, the image data and the electronic data of the form are collectively referred to as "form data". The processing execution server 200 analyzes the form data acquired from the image processing apparatus 100, and performs data processing according to content of the form recognized based on an analysis result. Further, the processing execution server 200 specifies a storage destination of the analysis result and a data processing result based on the content of the form. Then, the processing execution server 200 returns the analysis result of the form data and the data processing result according to the content of the form in response to the request from the image processing apparatus 100. The image processing apparatus 100 sends and stores the analysis result and the data processing result acquired from the processing execution server 200 to the management server 300.

Configuration of Information Processing Apparatus

Figure 2:
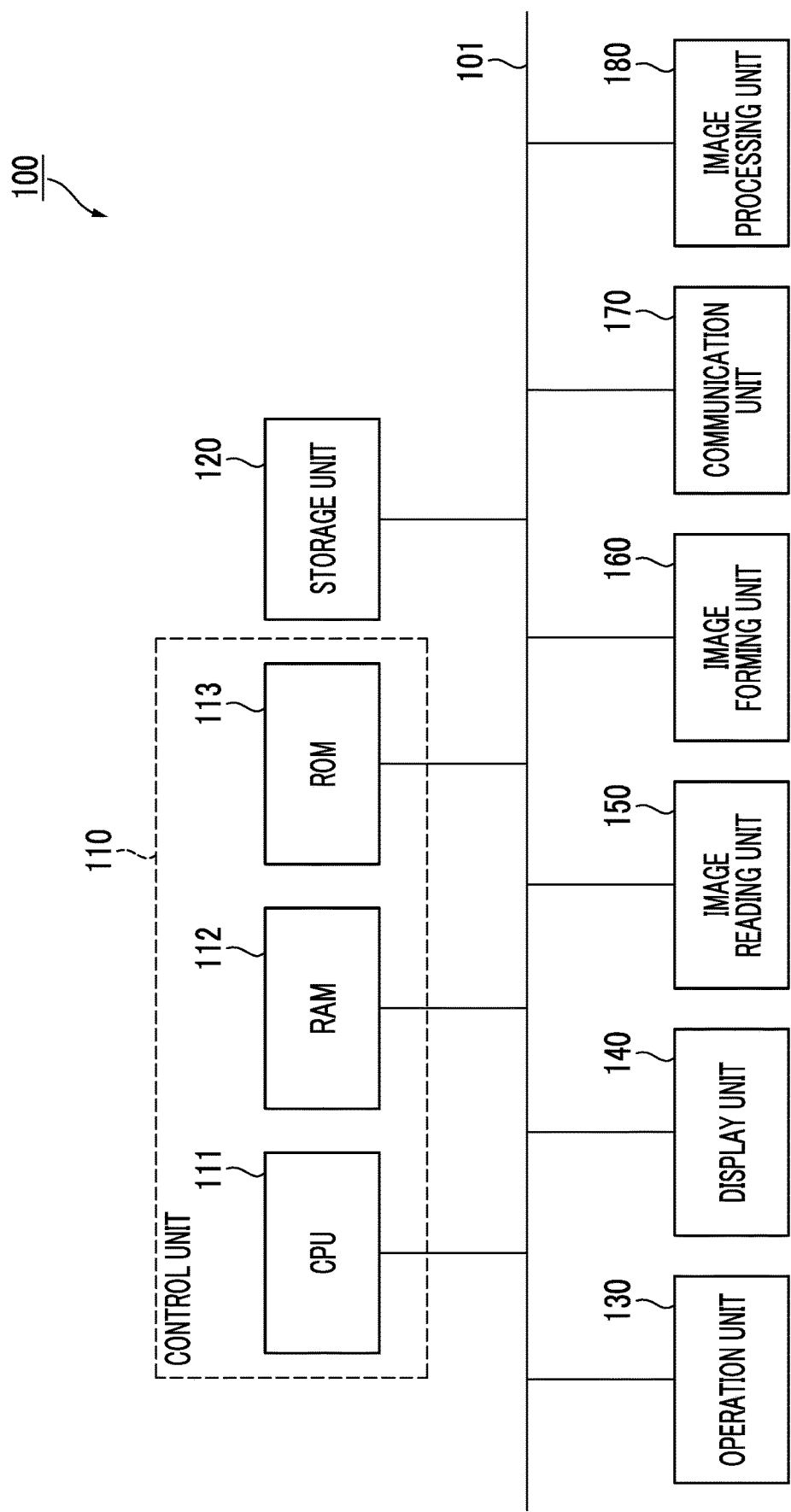
FIG. 2 is a diagram illustrating a configuration of an image processing apparatus.

FIG. 2 is a diagram illustrating a configuration of the image processing apparatus 100. Here, the configuration of the image processing apparatus 100 as an example of the information processing apparatus 100 will be described. The image processing apparatus 100 includes a control unit 110, a storage unit 120, an operation unit 130, a display unit 140, an image reading unit 150, an image forming unit 160, a communication unit 170, and an image processing unit 180. Each of the functional units is connected to a bus 101, and exchanges data via the bus 101.

The control unit 110 controls each of the above-described functional units in the image processing apparatus 100. Further, the control unit 110 is a functional unit that executes various data processing. The control unit 110 includes a Central Processing Unit (CPU) 111 that is an arithmetic calculation section, and a Random Access Memory (RAM) 112 and a Read Only Memory (ROM) 113 that are storage sections. The RAM 112 is a main storage device (main memory) and is used as a working memory in a case where the CPU 111 performs arithmetic calculation processing. The ROM 113 holds a program and data such as a set value that is prepared in advance, and the CPU 111 directly reads the program and the data from the ROM 113 and executes processing. The program and the data are also stored in the storage unit 120. The CPU 111 reads and executes the program stored in the storage unit 120 in the RAM 112. Functions for performing various data processing and control in the image processing apparatus 100, which will be described later, are realized by executing the program by, for example, the CPU 111.

The storage unit 120 is a functional unit that stores programs and data to be executed by the CPU 111 as described above, and also stores various data, such as image data read by the image reading unit 150, generated by various operations. The storage unit 120 is realized by, for example, a storage device such as a magnetic disk device or a Solid State Drive (SSD).

The operation unit 130 is a functional unit that accepts an operation of a user. The operation unit 130 is configured with, for example, a hardware key, a touch sensor that outputs a control signal according to a position pressed or touched by a finger, or the like. The operation unit 130 may be configured as a touch panel in which a touch sensor is combined with a liquid crystal display configuring the display unit 140.

The display unit 140 is a functional unit that displays an information image that presents various information to the user, a preview image of an image to be processed, for example, to be read or to be output, an operation image to be operated by the user, and the like. The display unit 140 is configured with, for example, the liquid crystal display. The operation unit 130 and the display unit 140 may be combined to be used as a user interface section for the user to input and output information to and from the image processing apparatus 100.

The image reading unit 150 is a functional unit that optically reads an image on a document. A method for reading the image is used with, for example, a CCD method in which reflected light for light irradiating the document from a light source is reduced by a lens and received by Charge Coupled Devices (CCD), or a CIS method in which the reflected light for light irradiating the document in order from a Light Emitting Diode (LED) light source is received by the Contact Image Sensor (CIS).

The image forming unit 160 is a functional unit that forms an image based on the image data on a recording material, such as paper, by using an image forming material. As a method for forming the image on the recording material, for example, an electrophotographic method is used in which toner is used as the image forming material and the image is formed by transferring the toner attached to a photoconductor to the recording material.

The communication unit 170 is a functional unit that transmits and receives a command and data to and from the external apparatus. As the communication unit 170, an interface corresponding to a communication method with the external apparatus is used. The connection with the external apparatus may be performed via the network or may be performed by direct connection. A communication line may be a wired line or a wireless line.

The image processing unit 180 is a functional unit that includes a processor as an arithmetic calculation section and a working memory, and performs image processing, such as color correction or gradation correction, on the image represented by the image data. The CPU 111 of the control unit 110 may be used as the processor, and the RAM 112 of the control unit 110 may be used as the working memory, respectively.

Transfer of Data and Procedure of Processing

Next, a transfer of data and a procedure of processing between the image processing apparatus 100 and the processing execution server 200 will be described. In the description below, the above-described form data will be described as an example of data to be processed.

The image processing apparatus 100 accesses the processing execution server 200, causes the processing execution server 200 to execute a part of processing such as analysis of the form data to be processed, and acquires the processing result. Here, the image processing apparatus 100 executes an operation of sending the form data to be processed to the processing execution server 200 and an operation of acquiring the processing result from the processing execution server 200 as different jobs. Hereinafter, the operation of sending the data to be processed to the processing execution server 200 is referred to as a first job, and the operation of acquiring the processing result from the processing execution server 200 is referred to as a second job.

By dividing the operations as different jobs, the image processing apparatus 100 can release the resource, such as a memory area, used for execution of the job and can use the resource to execute another processing until the second job is started after the first job ends. On the other hand, since the operations are divided as the different jobs, a mechanism is necessary for the image processing apparatus 100 and the processing execution server 200 to recognize that the jobs are related jobs related to an identical processing target. Here, as an example, a job ID as identification information used to identify the related job is set.

Further, the processing execution server 200 cannot access the image processing apparatus 100 over the firewall 400. Therefore, in order for the processing execution server 200 to send the processing result to the image processing apparatus 100, the image processing apparatus 100 needs to make a processing result transmission request to the processing execution server 200. Therefore, a mechanism is necessary for the image processing apparatus 100 to recognize that the processing of the processing execution server 200 is completed. Here, an operation for inquiring whether or not the processing is completed is performed from the image processing apparatus 100 to the processing execution server 200.

Figure 3:
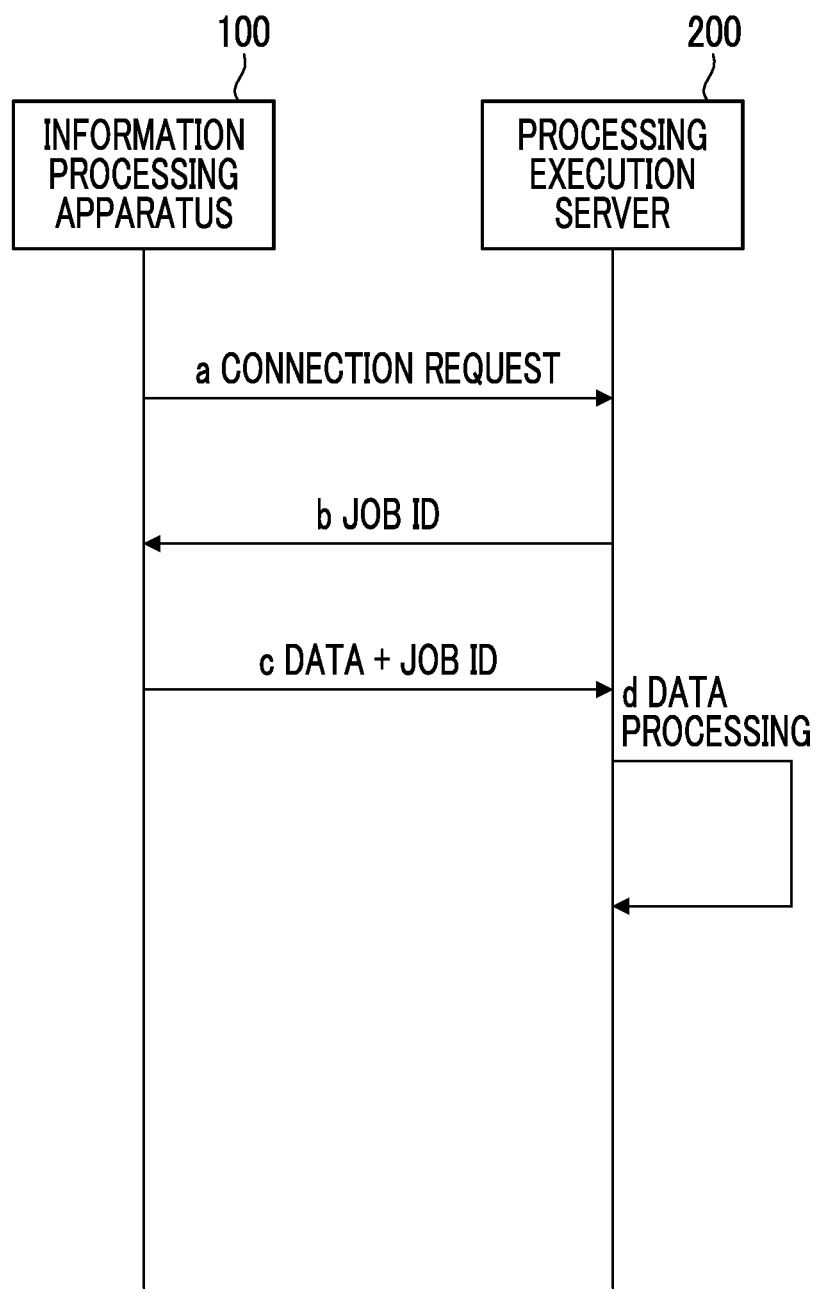
FIG. 3 is a sequence diagram showing data exchange between the image processing apparatus and a processing execution server in a first job.

FIG. 3 is a sequence diagram showing data exchange between the image processing apparatus 100 and the processing execution server 200 in the first job. First, the image processing apparatus 100 (described as "information processing apparatus" in the drawing) makes a connection request to the processing execution server 200 (a). The processing execution server 200 generates a job ID in response to the connection request, and transmits the job ID to the image processing apparatus 100 (b). In a case where the image processing apparatus 100 acquires the job ID from the processing execution server 200, the image processing apparatus 100 adds the acquired job ID to the form data to be processed and transmits the form data to the processing execution server 200 (c).

In a case where the processing execution server 200 receives the data to be processed and the job ID, the processing execution server 200 executes processing for the received form data (d). Here, the processing execution server 200 analyzes the received form data and recognizes the content of the form. Then, the processing execution server 200 executes data processing according to the content of the recognized form. Further, depending on content of the data processing, the processing execution server 200 adds information obtained by executing the data processing, as additional information, to the processing result. For example, in a case where the image processing apparatus 100 stores the processing result by the processing execution server 200 in the management server 300 and in a case where the storage destination information is obtained from the analysis result or the data processing result by the processing execution server 200, the storage destination information is added to the processing result.

Figure 4:
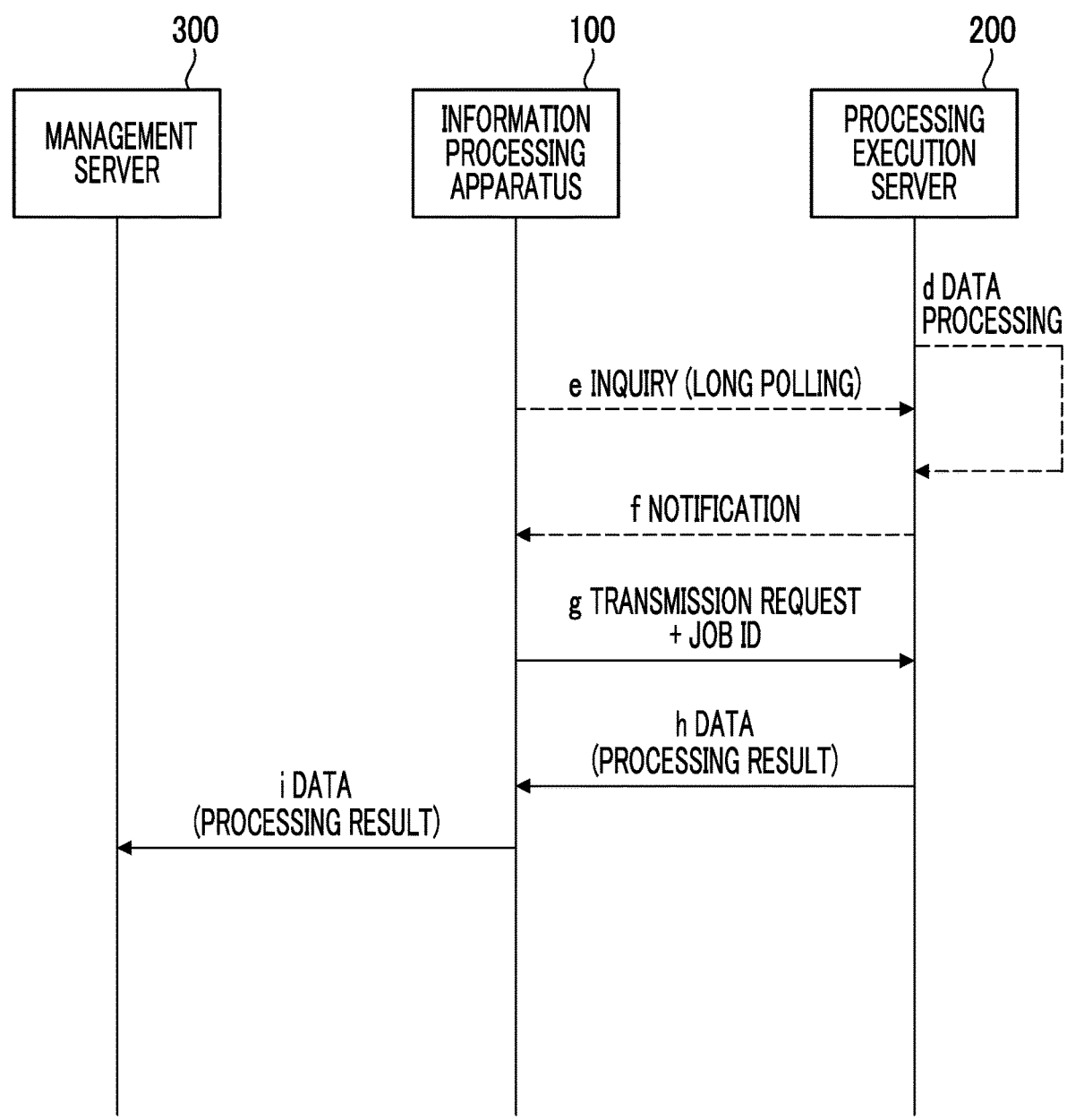
FIG. 4 is a sequence diagram showing data exchange between the image processing apparatus and the processing execution server in a second job.

FIG. 4 is a sequence diagram showing data exchange between the image processing apparatus 100 and the processing execution server 200 in the second job. After the image processing apparatus 100 (described as "information processing apparatus" in the drawing) transmits the form data to the processing execution server 200, the image processing apparatus 100 makes an inquiry to receive a notification that the processing is completed from the processing execution server 200 (*e*). The inquiry is made, for example, by long polling. In a case where the processing execution server 200 accepts the inquiry from the image processing apparatus 100, the processing execution server 200 responds to the inquiry and notifies the image processing apparatus 100 that the data processing is completed, after data processing (d) is completed (f).

In a case where the image processing apparatus 100 receives the notification indicating that the data processing is completed from the processing execution server 200, the image processing apparatus 100 transmits the processing result transmission request to the processing execution server 200, together with the job ID acquired in the first job (g). The processing execution server 200 returns the processing result corresponding to the job ID to the image processing apparatus 100 in response to the transmission request received from the image processing apparatus 100 (*h*). The image processing apparatus 100 sends the processing result acquired from the processing execution server 200 to the management server 300 (*i*). At this time, in a case where the additional information is added to the processing result, the image processing apparatus 100 may execute processing for the processing result acquired from the processing execution server 200 based on the acquired additional information. For example, in a case where the storage destination information of the processing result is added to the processing result as the additional information, the image processing apparatus 100 transmits the processing result to the storage destination based on the additional information.

As described above, in the present exemplary embodiment, in a case where the image processing apparatus 100 accesses the processing execution server 200, the processing execution server 200 issues the job ID and the job ID is shared between the image processing apparatus 100 and the processing execution server 200. Then, the image processing apparatus 100 adds the job ID to the data to be transmitted to the processing execution server 200 in the first job and the transmission request to acquire the processing result in the second job. As a result, the processing execution server 200 recognizes that the data to be processed, which is received in advance, and the processing result transmission request received later are due to the related jobs.

Further, the image processing apparatus 100 makes an inquiry about the completion of the processing to the processing execution server 200 after transmitting the data to be processed to the processing execution server 200. In a case where the processing execution server 200 responds to the inquiry, the processing execution server 200 can provide the notification that the processing is completed to the image processing apparatus 100 over the firewall 400, and the image processing apparatus 100 can recognize that the processing is completed in the processing execution server 200. As long as the inquiry can pass through the firewall 400 in such a way that the processing execution server 200 responds, a method is not particularly limited. As an example, in a case where long polling is used as described above, complexity of repeating the inquiry many times until the image processing apparatus 100 receives the response from the processing execution server 200 as in normal polling can be suppressed.

Operation of Information Processing Apparatus

Figure 5:
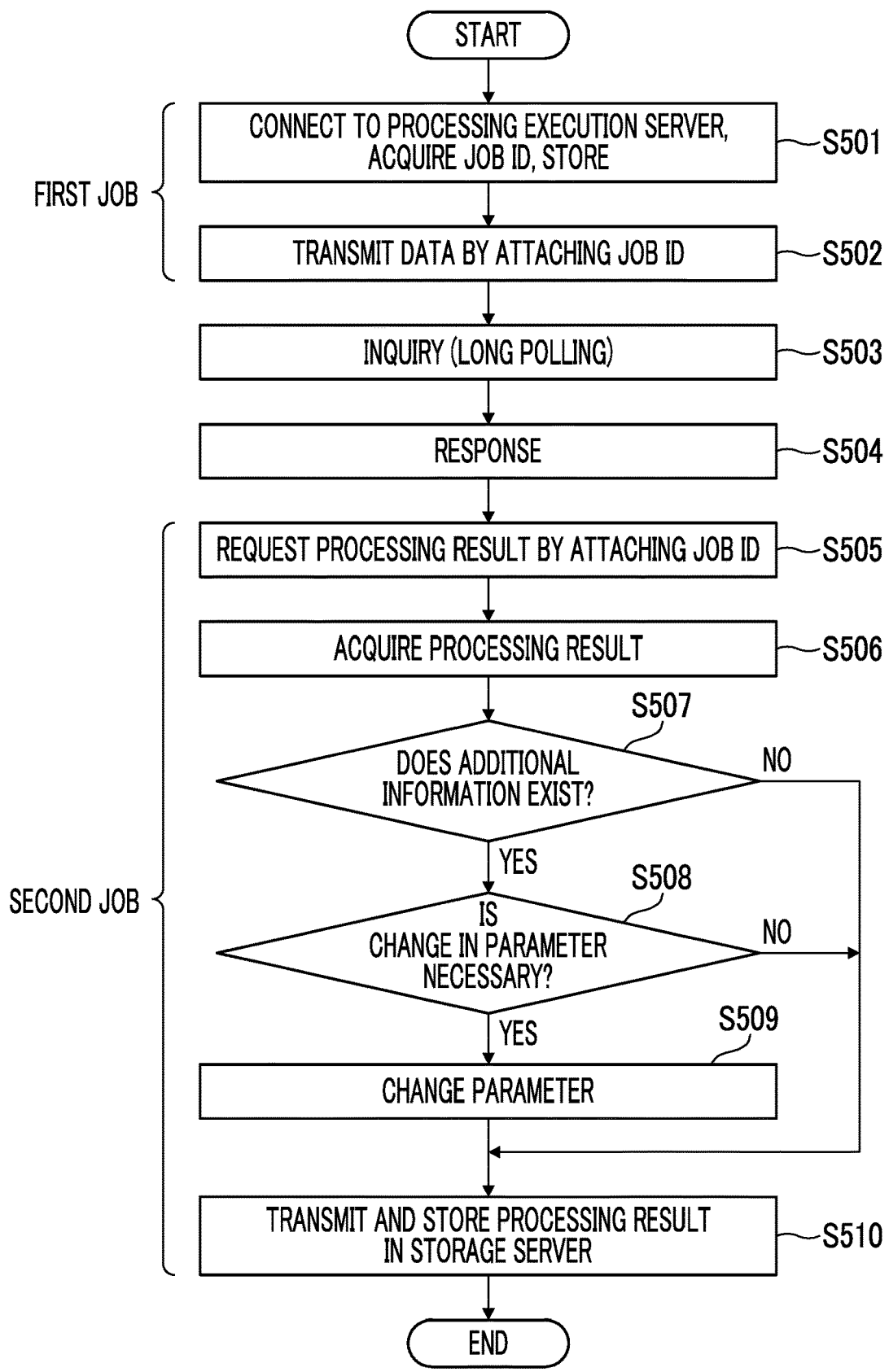
FIG. 5 is a flowchart showing an operation of an information processing apparatus.

FIG. 5 is a flowchart showing an operation of the information processing apparatus 100. In an operation example, the above-described form data will be described as an example of data to be processed. The image processing apparatus 100 as the information processing apparatus 100 first connects to the processing execution server 200, acquires and stores the job ID from the processing execution server 200 (S501). The acquired job ID is stored in, for example, the storage unit 120 shown in FIG. 2. Next, the image processing apparatus 100 attaches the acquired job ID to the form data to be processed and transmits the form data to the processing execution server 200 (S502). As a result, data processing is started in the processing execution server 200. The above operation corresponds to an operation of the first job by the information processing apparatus 100.

Next, the image processing apparatus 100 makes the inquiry about the completion of the processing to the processing execution server 200 (S503). The inquiry is made by, for example, long polling. In a case where the response to the inquiry is accepted from the processing execution server 200 (S504), the image processing apparatus 100 attaches the job ID acquired in S501 to the processing result transmission request and transmits the resulting processing result transmission request to the processing execution server 200 (S505). Then, the image processing apparatus 100 acquires the processing result from the processing execution server 200 (S506). The operation subsequent to the processing result transmission request shown in S505 corresponds to the operation of the second job by the information processing apparatus 100.

Next, the image processing apparatus 100 determines whether or not additional information is added to the acquired processing result. Here, information indicating the storage destination of the processing result may be added as the additional information. For example, in a case where a path of the management server 300 is specified as the storage destination according to a type of the form to be processed or in a case where the storage destination is recorded in a document of the form, the processing execution server 200 specifies the storage destination of the processing result in the processing result of the form data. In such a case, the storage destination information specified by the data processing is added to the processing result as the additional information.

In a case where the additional information is added to the processing result (YES in S507), the image processing apparatus 100 determines whether or not a parameter needs to be changed in processing to be executed for the processing result of the processing execution server 200 based on the additional information. For example, in the above example in which the storage destination information is added, in a case where only the management server 300 is determined to be related to the storage destination and the path of the management server 300 is specified by the additional information, addition of the path is necessary as the parameter in the storage destination information. Further, in a case where the path of the management server 300 is determined to be related to the storage destination in advance but the path specified by the additional information is different from a predetermined path, a change in the path is necessary as the parameter in the storage destination information. On the other hand, in a case where the path of the management server 300 is determined to be related to the storage destination in advance and the path specified by the additional information is identical with the predetermined path, the change in the path is not necessary as the parameter in the storage destination information.

In a case where the change in the parameter is necessary (YES in S508), the image processing apparatus 100 changes the corresponding parameter based on the additional information (S509). Then, the image processing apparatus 100 transmits and stores the processing result to the management server 300, which is a storage server, according to the changed parameter (S510). Further, in a case where the additional information is not added to the processing result acquired from the processing execution server 200 (NO in S507) and in a case where the parameter does not need to be changed based on the additional information (NO in S508), the image processing apparatus 100 transmits and stores the processing result in the management server 300 according to original setting (S510).

Operation of Processing Execution Server

Figure 6:
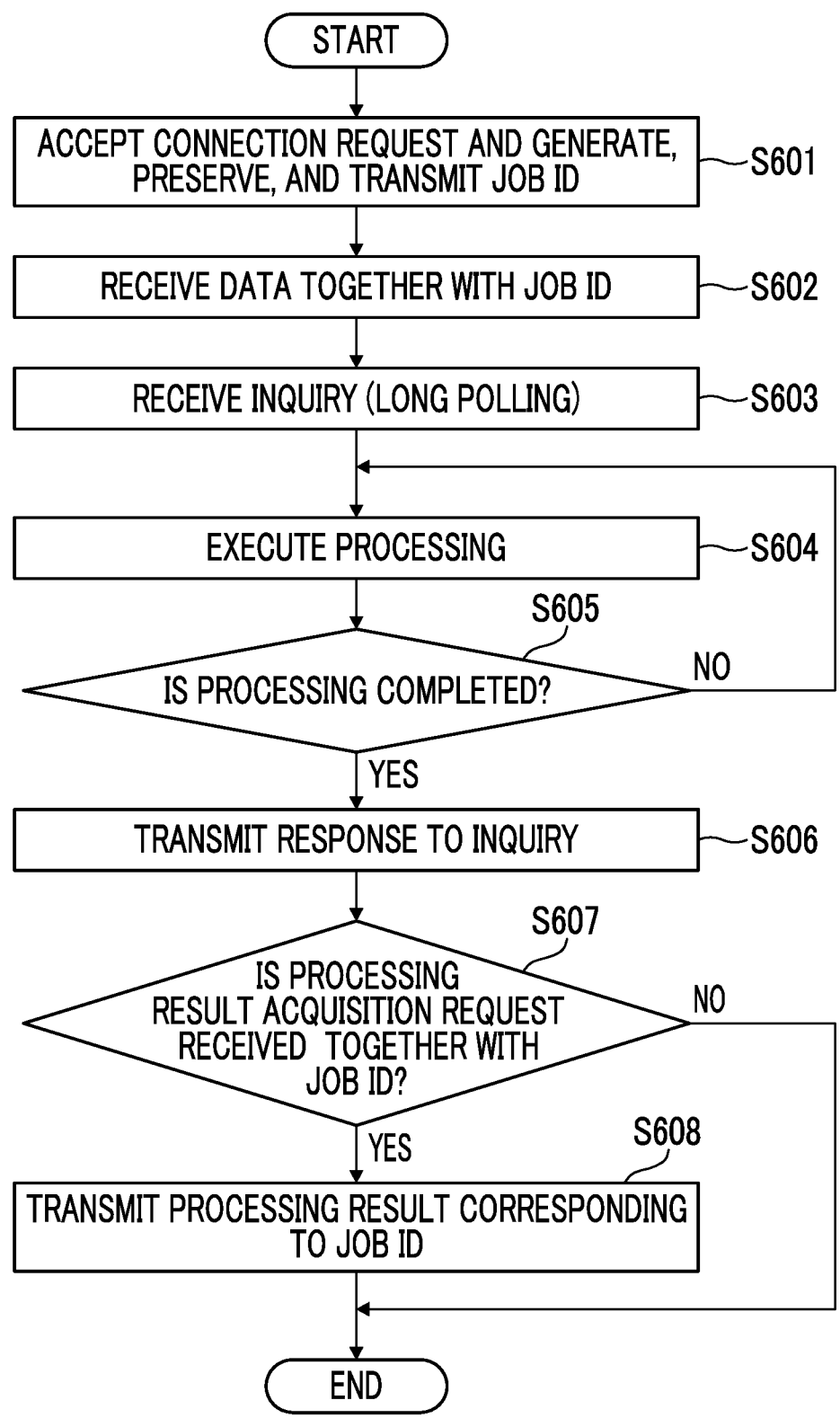
FIG. 6 is a flowchart showing an operation of processing execution.

FIG. 6 is a flowchart showing an operation of the processing execution server 200. In a case where the processing execution server 200 accepts the connection request from the image processing apparatus 100, the processing execution server 200 generates and stores the job ID, and transmits the generated job ID to the image processing apparatus 100 (S601). Thereafter, the processing execution server 200 receives the form data to be processed, to which the job ID is added from the image processing apparatus 100 (S602). Further, the processing execution server 200 accepts an inquiry about the completion of processing from the image processing apparatus 100 (S603).

The processing execution server 200 executes processing on the received form data (S604), and, in a case where the processing is completed, transmits a response to the inquiry accepted in S603 to the image processing apparatus 100 (S605 and S606). Thereafter, in a case where the processing execution server 200 receives a processing result acquisition request, to which the job ID generated in S601 is added, from the image processing apparatus 100 (YES in S607), the processing execution server 200 transmits the processing result corresponding to the received job ID to the image processing apparatus 100 (S608).

On the other hand, in a case where the processing result does not need to be transmitted to the image processing apparatus 100, the processing result acquisition request is not transmitted from the image processing apparatus 100 (NO in S607), so that the processing execution server 200 ends the processing. The case where the processing result does not need to be transmitted to the image processing apparatus 100 is a case where the image processing apparatus 100 does not perform processing on the processing result of the processing execution server 200.

For example, the above case includes a case where the processing result is held in the processing execution server 200 without returning to the image processing apparatus 100, or a case where the processing result is stored in a server provided outside the firewall 400 (the same side as the processing execution server 200). Whether or not the processing result needs to be transmitted to the image processing apparatus 100 is predetermined, and includes a case of being specified in a case where the form data to be processed is received and a case of being specified as a result of the data processing.

Operation in Case where Connection Between Information Processing Apparatus and Processing Execution Server is Disconnected Next, an operation of the information processing apparatus 100 and the processing execution server 200 in a case where connection between the information processing apparatus 100 and the processing execution server 200 is disconnected will be described. In a case where the processing execution server 200 executes the data processing on a request from the image processing apparatus 100 as the information processing apparatus 100, an event may occur in which the image processing apparatus 100 cannot acquire the processing result of the processing execution server 200. For example, a case where, after the first job ends, the image processing apparatus 100 cannot be connected to the processing execution server 200 because a failure occurs in the image processing apparatus 100, a case where the image processing apparatus 100 is turned off, or the like may be conceivable. In such a case, after the connection between the image processing apparatus 100 and the processing execution server 200 is restored, an operation is necessary of acquiring the processing result by making a transmission request from the image processing apparatus 100 to the processing execution server 200.

Figure 7:
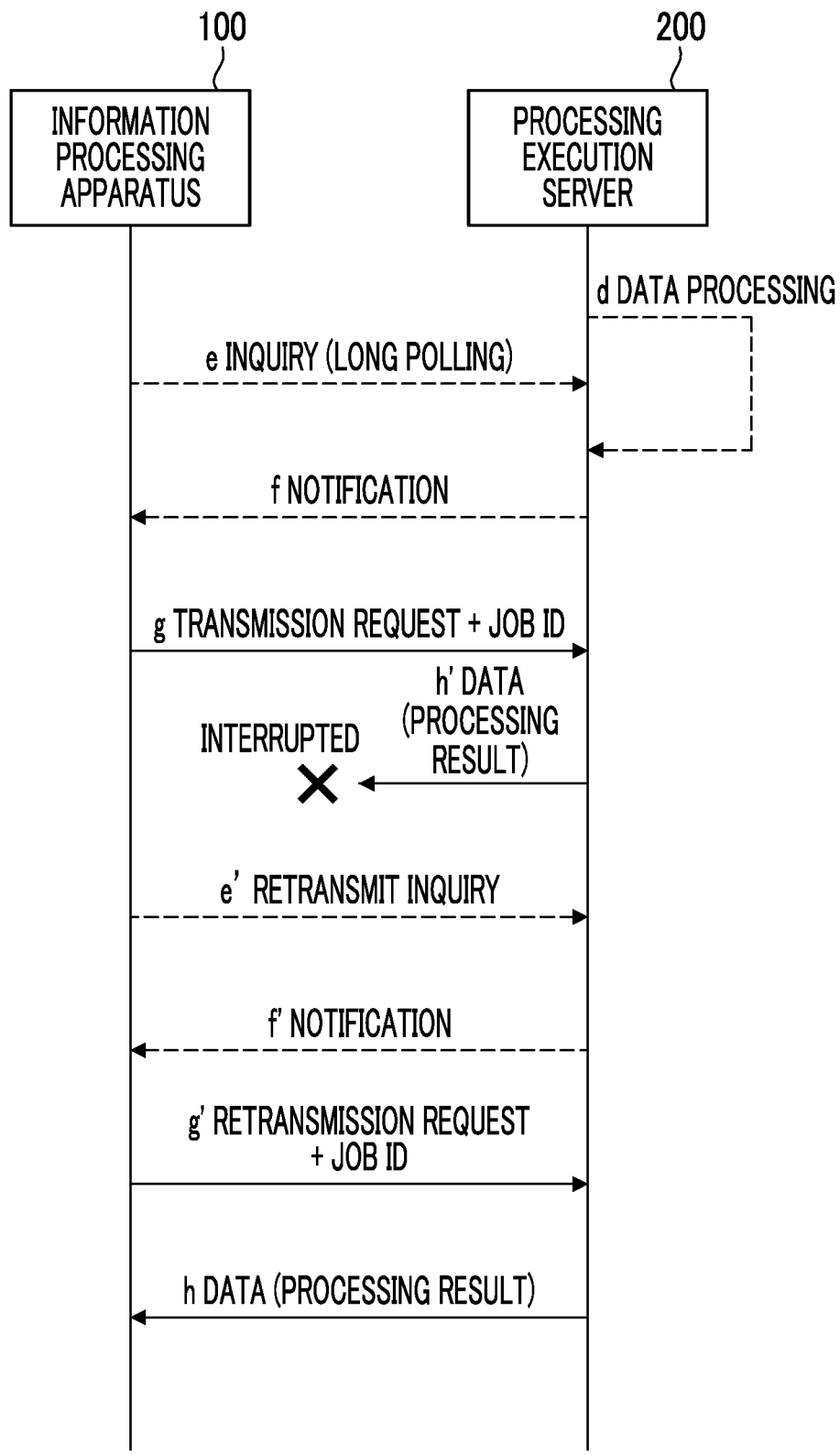
FIG. 7 is a sequence diagram showing an operation in a case where a connection between the image processing apparatus and the processing execution server is disconnected in the second job.

FIG. 7 is a sequence diagram showing an operation in a case where the connection between the image processing apparatus 100 and the processing execution server 200 is disconnected in the second job. FIG. 7 shows an operation in a case of the second job and focuses on restart of the data exchange between the image processing apparatus 100 and the processing execution server 200 here, so that description of transmission of data from the image processing apparatus 100 to the management server 300 (operation (i) in FIG. 4), which are shown in FIG. 4, is omitted.

In FIG. 7, each of the operations including data processing (d) in the processing execution server 200, an inquiry (e) from the image processing apparatus 100 to the processing execution server 200, notification (f) from the processing execution server 200 to the image processing apparatus 100, and the processing result transmission request (g) from the image processing apparatus 100 to the processing execution server 200 is the same as the operations (d) to (g) shown in FIG. 4. Next, the processing execution server 200 transmits the processing result in response to the request from the image processing apparatus 100, the connection between the image processing apparatus 100 and the processing execution server 200 is disconnected, and transfer of the processing result is interrupted (h').

In a case where the connection between the image processing apparatus 100 and the processing execution server 200 is restored, the image processing apparatus 100 makes an inquiry to the processing execution server 200 to receive the notification that the processing is completed (e'). In the inquiry, the processing execution server 200 may be notified that the inquiry is made again.

In a case where the processing execution server 200 accepts the inquiry from the image processing apparatus 100, the processing execution server 200 responds to the inquiry and provides a notification that the data processing is completed to the image processing apparatus 100 (f').

In a case where the image processing apparatus 100 receives the notification that the data processing is completed from the processing execution server 200, the image processing apparatus 100 transmits the processing result re-transmission request to the processing execution server 200, together with the job ID acquired in the first job (g'). The processing execution server 200 returns the processing result corresponding to the job ID to the image processing apparatus 100 in response to the transmission request received from the image processing apparatus 100 (h).

In the above example, the operation is described in a case where the transmission of the processing result from the processing execution server 200 to the image processing apparatus 100 is interrupted because the connection between the image processing apparatus 100 and the processing execution server 200 is disconnected. On the other hand, similarly to the case where the connection between the image processing apparatus 100 and the processing execution server 200 is disconnected in a stage before the transmission of the processing result from the processing execution server 200 to the image processing apparatus 100 is performed, the inquiry from the image processing apparatus 100 is executed again after the connection is restored, and subsequent exchange is performed. In a case where the connection between the image processing apparatus 100 and the processing execution server 200 is disconnected before an initial inquiry (e) is made from the image processing apparatus 100, the initial inquiry (e) may be made from the image processing apparatus 100 as a normal operation after the connection is restored.

Operation of Information Processing Apparatus when Connection is Disconnected

Figure 8:
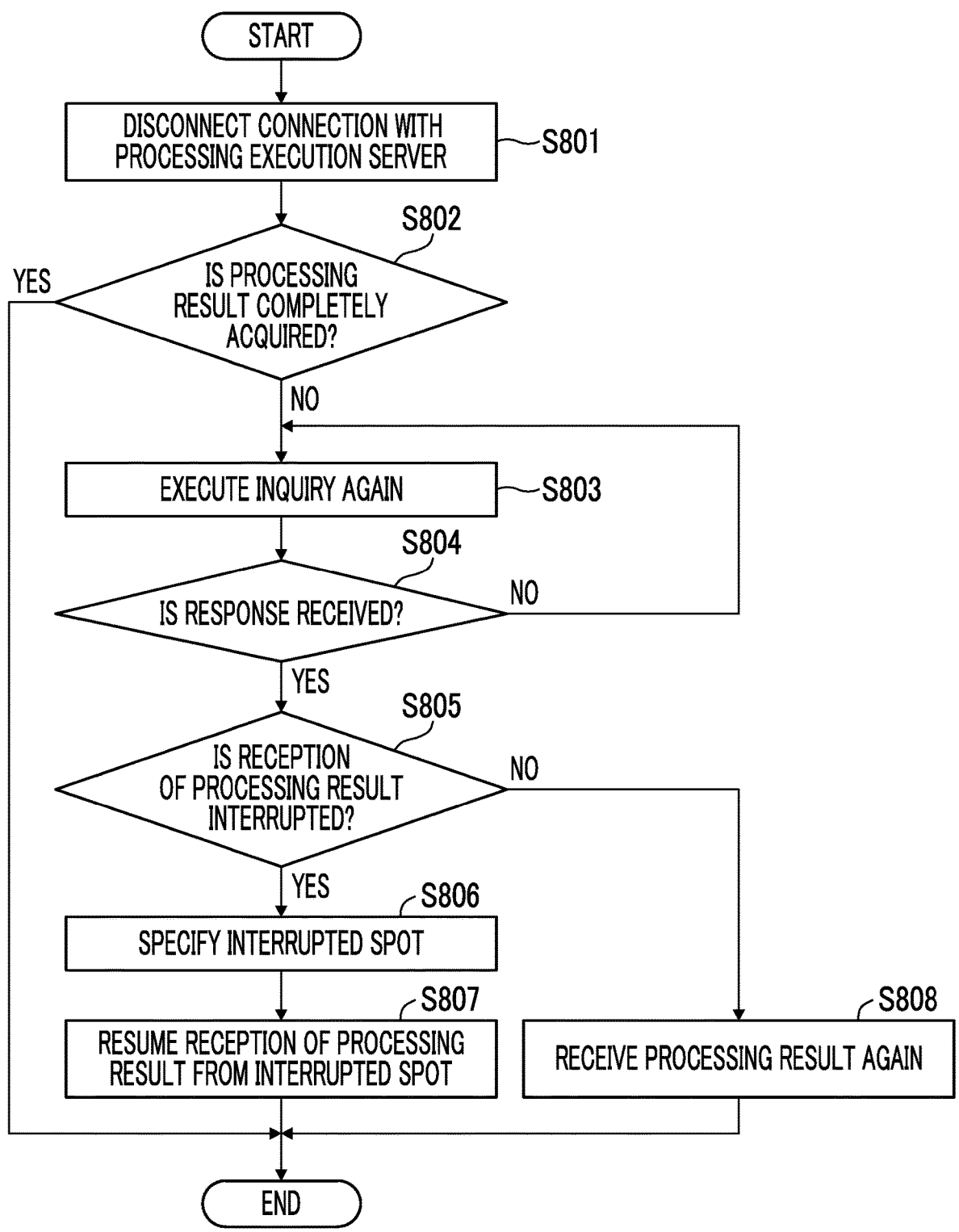
FIG. 8 is a flowchart showing the operation of the information processing apparatus in the case where the connection between the information processing apparatus and the processing execution server is disconnected.

FIG. 8 is a flowchart showing an operation of the information processing apparatus 100 in a case where the connection between the information processing apparatus 100 and the processing execution server 200 is disconnected. In a case where the connection with the processing execution server 200 is disconnected (S801), the image processing apparatus 100 as the information processing apparatus 100 first determines whether or not the processing result is acquired from the processing execution server 200. In a case where the processing result is completely acquired (YES in S802), the image processing apparatus 100 does not need to acquire the processing result again. Therefore, the image processing apparatus 100 proceeds to the operation subsequent to S507 shown in FIG. 5.

In a case where the processing result is not completely acquired (NO in S802), the image processing apparatus 100 executes the inquiry about the completion of the processing again to the processing execution server 200 (S803). In a case where the initial inquiry is made, the image processing apparatus 100 stores information indicating that the inquiry is made in a non-volatile storage section (for example, the storage unit 120 shown in FIG. 2). The information is removed in a case where a response to the inquiry is received. Then, the image processing apparatus 100 confirms the storage section after the connection with the processing execution server 200 is disconnected, and executes the inquiry again in a case where there is an inquiry which does not receive a response. A timing to make the inquiry may be, for example, after a predetermined time elapses after the connection with the processing execution server 200 is disconnected. In a case where, for example, there is no response to the inquiry from the processing execution server 200 for a predetermined time (NO in S804), the image processing apparatus 100 determines that the connection with the processing execution server 200 is not restored, and repeats an inquiry about completion of the processing. Further, the image processing apparatus 100 and the processing execution server 200 perform communication with each other, and the inquiry may be executed again after restoration of the connection between the processing execution server 200 and the processing execution server 200 is confirmed.

In a case where there is a response to the inquiry from the processing execution server 200 (YES in S804), the image processing apparatus 100 determines whether or not reception of the processing result is interrupted. In other words, the image processing apparatus 100 determines whether or not the disconnection of the connection with the processing execution server 200 occurs while the processing result is received. In a case where the reception of the processing result is interrupted (YES in S805), the image processing apparatus 100 specifies a spot at which the reception is interrupted (S806), and restarts the reception of the processing result subsequent to the interrupted spot (S807).

Here, in order to specify the spot at which the reception is interrupted, in a case where the processing result is transmitted from the processing execution server 200 to the image processing apparatus 100, at least one of the processing execution server 200 or the image processing apparatus 100 needs to monitor how far of the entire processing result is completely transmitted at any time. For example, in a case where there are a plurality of data files of the processing result to be transmitted, information on whether or not transmission is completed may be stored for each file. In addition, various existing mechanisms that may monitor progress of transfer in the data transfer may be applied.

The interrupted spot may be specified based on data of non-transmitted processing result in the processing execution server 200, or may be specified based on data of the processing result for the completed reception in the image processing apparatus 100.

In the former case, the processing execution server 200 specifies the interrupted spot to transmit the data of the non-transmitted processing result. Therefore, the image processing apparatus 100 does not need to hold the information of the processing result whose reception is completed, and the reception subsequent to the interrupted spot is restarted by simply requesting the processing execution server 200 to retransmit the processing result.

In the latter case, the information of the processing result for the completed reception in the image processing apparatus 100 is sent to the processing execution server 200. Then, based on the information, the processing execution server 200 specifies and transmits the data of the processing result that is not received by the image processing apparatus 100. Therefore, a load on the image processing apparatus 100 is large as compared with the former case.

However, in a case where there is a time lag until the data transmitted from the processing execution server 200 is completely received in the image processing apparatus 100 and there is a possibility that the connection between the processing execution server 200 and the image processing apparatus 100 is disconnected during the time lag, the latter method may more accurately specify the interrupted spot. In an operation example shown in FIG. 8, the latter method is assumed, and the image processing apparatus 100 specifies the interrupted spot.

In a case where the reception of the processing result is not interrupted (NO in S805), in other words, in a case where a timing at which the connection is disconnected is before the reception of the processing result is started, the image processing apparatus 100 requests the processing execution server 200 to receive all the data of the processing result (S808).

Operation of Processing Execution Server when Connection is Disconnected

Figure 9:
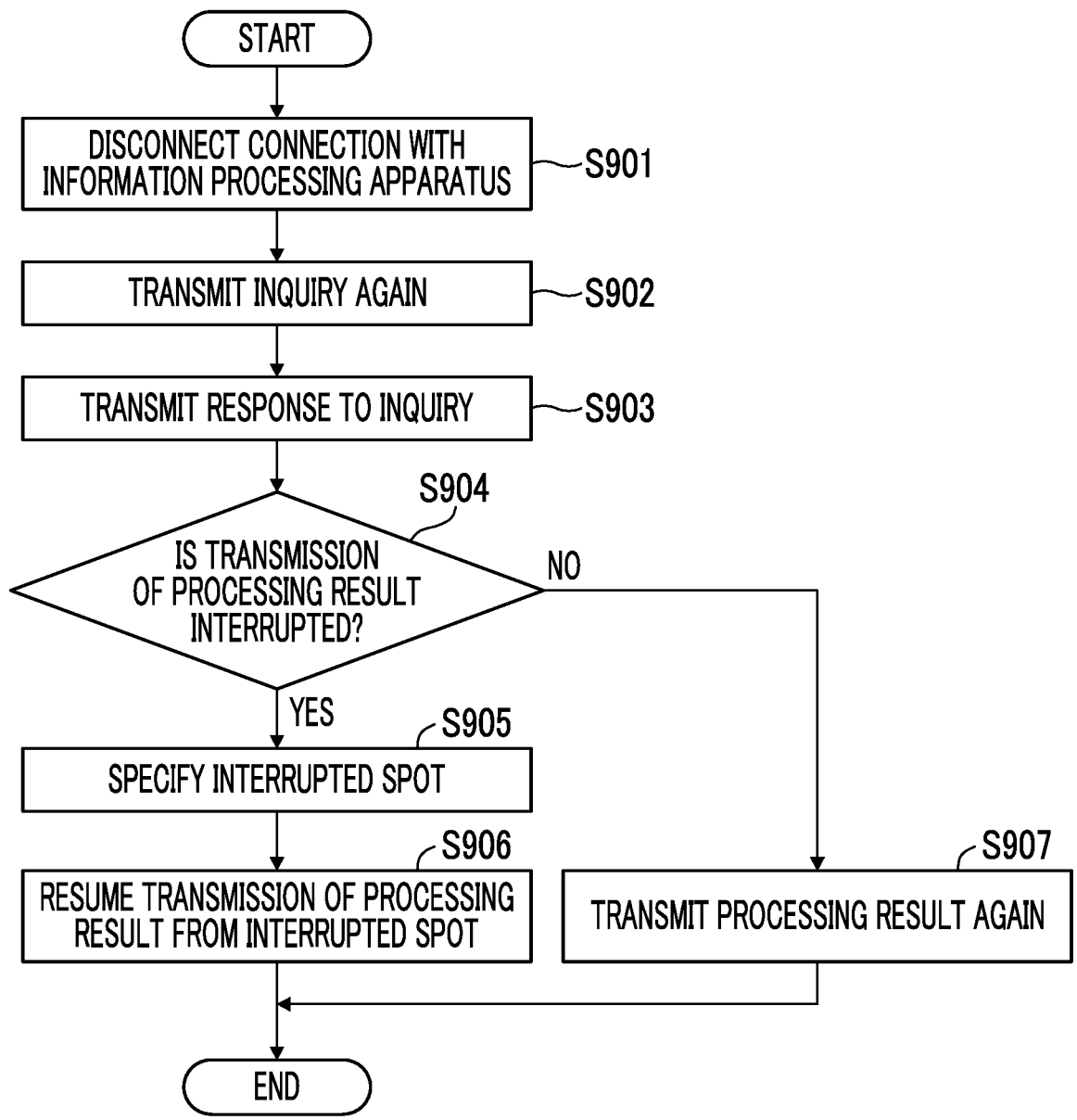
FIG. 9 is a flowchart showing an operation of the processing execution server in the case where the connection between the information processing apparatus and the processing execution server is disconnected.

FIG. 9 is a flowchart showing an operation of the processing execution server 200 in the case where the connection between the information processing apparatus 100 and the processing execution server 200 is disconnected. In a case where the connection with the image processing apparatus 100 as the information processing apparatus 100 is disconnected (S901) and, thereafter, an inquiry about the completion of processing is received again from the image processing apparatus 100 (S902), the processing execution server 200 transmits a response to the inquiry (S903). The inquiry is made, for example, together with a notification indicating re-execution of the inquiry that is already made, so that the processing execution server 200 recognizes re-execution of the inquiry made before the connection between the information processing apparatus 100 and the processing execution server 200 is disconnected.

Next, the processing execution server 200 determines whether or not the transmission of the processing result is interrupted. In other words, the processing execution server 200 determines whether or not the disconnection of the connection with the image processing apparatus 100 occurs while the processing result is transmitted. In a case where the transmission of the processing result is interrupted (YES in S904), the processing execution server 200 specifies the spot at which the transmission is interrupted (S905), and restarts the transmission of the processing result subsequent to the interrupted spot (S906).

Ina case where the transmission of the processing result is not interrupted (NO in S904), in other words, in a case where the timing at which the connection is disconnected is before the transmission of the processing result is started, the processing execution server 200 transmits all the data of the processing result in response to the request from the image processing apparatus 100 (S907).

First Modification Example

In the present exemplary embodiment, the operation of sending the form data to be processed by the information processing apparatus 100 to the processing execution server 200 and the operation of acquiring the processing result from the processing execution server 200 are set as different jobs. Utilizing this, as a modification example of the present exemplary embodiment, a configuration may be provided in which the first job and the second job are executed by different information processing apparatuses 100. In other words, an execution authority of the second job related to the first job performed by one information processing apparatus 100 may be settable to the other information processing apparatus 100. In this case, the other information processing apparatus 100 executes the second job to which the execution authority is set, and acquires the data of the processing result for the data to be processed, which is transmitted to the server in the first job related to the second job.

In a case where the processing execution server 200 executes data processing on a request from the information processing apparatus 100, an event may occur in which the information processing apparatus 100 cannot acquire the processing result of the processing execution server 200. For example, a case where, after the first job ends, the information processing apparatus 100 cannot perform connection to the processing execution server 200 because a failure occurs, a case where the information processing apparatus 100 is turned off, and a case where another processing having a large load is started in the information processing apparatus 100 may be conceivable. In such a case, the second job may be taken over and executed by an information processing apparatus 100 different from the information processing apparatus 100 that performs the first job. The takeover of the execution authority of the second job is performed by passing the job ID to the other information processing apparatus 100 by the information processing apparatus 100 that has performed the first job.

From the viewpoint of the information processing apparatus 100 that takes over the execution authority of the second job, the information processing apparatus 100 takes over the execution authority of the second job related to the first job executed by the other information processing apparatus 100 to execute the second job based on the execution authority. The information processing apparatus 100 acquires the job ID set for the first job executed by the other information processing apparatus 100, and adds the job ID in the second job to make a processing result data acquisition request to the processing execution server 200. Then, a processing result of data specified based on the job ID is acquired.

Figure 10:
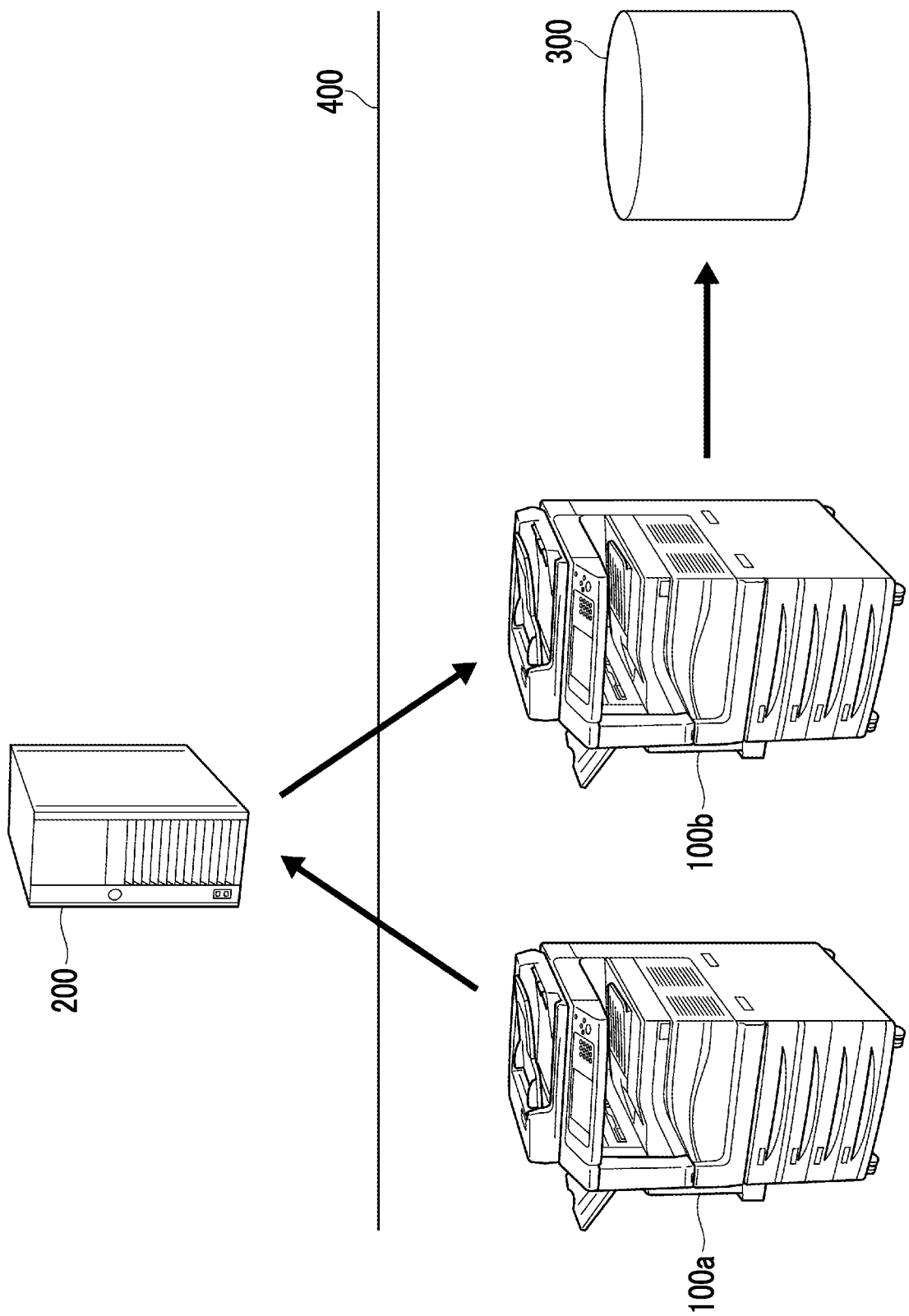
FIG. 10 is a diagram showing a first modification example of the information processing system according to the present exemplary embodiment.

FIG. 10 is a diagram showing a first modification example of the information processing system according to the present exemplary embodiment. In the example shown in FIG. 10, the information processing apparatus 100 that executes the first job is described as an information processing apparatus 100*a* with a subscript "a", and the information processing apparatus 100 that executes the second job is described as an information processing apparatus 100*b* with a subscript "b".

In the configuration shown in FIG. 10, the information processing apparatus 100*a* requests the processing execution server 200 for a part of the processing for the data to be processed as the first job. The processing execution server 200 performs processing for the data acquired from the information processing apparatus 100*a*. On the other hand, the information processing apparatus 100*b* makes the processing result transmission request to the processing execution server 200 as the second job. Ina case where the processing execution server 200 accepts the request from the information processing apparatus 100*b*, the processing execution server 200 returns the processing result to the information processing apparatus 100*b*. The information processing apparatus 100*b* sends the data of the processing result acquired from the processing execution server 200 to the management server 300.

Here, in the present exemplary embodiment, the job ID is used as a mechanism for the image processing apparatus 100 and the processing execution server 200 to recognize that the first job and the second job are related jobs related to the identical processing target. Specifically, the processing execution server 200 issues the job ID in response to an access from the information processing apparatus 100*a* to the processing execution server 200. Then, by adding the job ID for the transmission of the data to be processed, which is the first job, and the processing result transmission request, which is the second job, the processing execution server 200 recognizes that the operations are based on the related jobs. In a case where the processing execution server 200 accepts the processing result acquisition request made by adding the job ID from another information processing apparatus 100*b* different from the information processing apparatus 100*a* that performs the first job, the processing result of the data specified by the job ID is transmitted to the information processing apparatus 100*b*.

As shown in FIG. 7, similar to a case where the connection between the processing execution server 200 and the information processing apparatus 100*a* is disconnected while the processing result is transmitted from the processing execution server 200 to the information processing apparatus 100*a*, the other information processing apparatus 100*b* may take over the second job to acquire the processing result. In this case, even in a case where the information processing apparatus 100*a* acquires the data of the processing result up to the middle in interrupted communication, the information processing apparatus 100*b* does not have the data, so that all the data of the processing result is received from the processing execution server 200. Further, in a case where the connection between the processing execution server 200 and the information processing apparatus 100*a* is disconnected after the information processing apparatus 100a makes an inquiry about the completion of processing, the information processing apparatus 100b provides a notification that the inquiry about the completion of processing is made again to the processing execution server 200.

In the modification example, since the job ID is used in the second job, the job ID is passed from the information processing apparatus 100a to the information processing apparatus 100b. Here, in a case where the information processing apparatus 100a knows in advance that execution of the second job is difficult as in a case where processing with a large load is performed, the information processing apparatus 100b can be specified in advance and the job ID can be transferred and be held. On the other hand, in a case where the information processing apparatus 100a suddenly becomes unable to execute the second job due to the occurrence of a failure or the like, the information processing apparatus 100b cannot hold the job ID beforehand. Therefore, after confirming that the second job cannot be executed in the information processing apparatus 100a, a mechanism for enabling the job ID to be used in the information processing apparatus 100b is necessary.

As an example, the job ID is stored in a storage device that can be shared by the information processing apparatus 100a and the information processing apparatus 100b, and the job ID may be used in a case where the information processing apparatus 100b needs to execute the second job. In a case where the number of information processing apparatuses 100b capable of executing the second job is small, the job ID may be duplicated in advance and may be passed to and held in each of the information processing apparatuses 100b.

Further, in a case where the information processing apparatus 100b executes the second job on behalf of the information processing apparatus 100a, it is conceivable that not only the job ID is simply passed but also the authority to execute the second job is set for the information processing apparatus 100b. For example, a configuration may be provided in which the processing execution server 200 or another server (hereinafter, the servers are referred to as "authority management server") manages the execution authority of the second job, and accepts an application to execute the second job on behalf of the information processing apparatus 100a to set the execution authority by proxy. In this case, a setting authority of the execution authority by proxy may be limited to a specific user such as a manager of the information processing apparatus 100a or a user who executes the first job (hereinafter, the manager and the user are referred to as "authorized user"). The authorized user is specified, for example, based on login information in a case where the first job is executed, management information of the information processing apparatus 100a, and the like.

The authorized user connects to the authority management server using a terminal device of the user and requests the authority to execute the second job on behalf. Here, the terminal device of the authorized user is, for example, a personal computer or the like that can be connected to the authority management server via the network. A proxy execution authority is set, for example, by issuing a passcode by the authority management server and providing a notification to the terminal device of the authorized user. The authorized user who has acquired the passcode inputs the passcode to the information processing apparatus 100b and causes the second job to be executed. The information processing apparatus 100b notifies the processing execution server 200 of the input passcode, makes an inquiry about the completion of the processing, requests the acquisition of the processing result, and acquires the processing result.

Second Modification Example

In the present exemplary embodiment, the processing result of the processing execution server 200 is stored in the management server 300 provided inside the firewall 400 (the same side as the information processing apparatus 100). Therefore, the processing execution server 200 returns the processing result in response to the request from the information processing apparatus 100, and the information processing apparatus 100 sends the acquired processing result to the management server 300. On the other hand, in a case where the management server 300 exists outside the firewall 400 (on the same side as the processing execution server 200), the processing execution server 200 does not need to go through the information processing apparatus 100 in order to send the processing result to the management server 300.

FIG. 11 is a diagram showing a second modification example of the information processing system according to the present exemplary embodiment. In a configuration shown in FIG. 11, the management server 300 is provided outside the firewall 400 (on the same side as the processing execution server 200). Therefore, the processing execution server 200 does not need a transmission request by the information processing apparatus 100, and directly transmits the processing result to the management server 300 after the processing for the data to be processed is completed.

Here, in a case where it is necessary to recognize whether or not the processing of the processing execution server 200 is completed, an inquiry using the long polling or the like may be made in the information processing apparatus 100 as described with reference to the sequence diagram of FIG. 4 and the flowchart of FIG. 5. In this case, the processing execution server 200 does not return the processing result to the information processing apparatus 100 as a response to the inquiry, but returns information indicating that the processing is completed.

Hereinabove, although the exemplary embodiment of the present invention has been described, the technical scope of the exemplary embodiment of the present invention is not limited to the above exemplary embodiment. For example, in the above exemplary embodiment, the processing result of the processing execution server 200, which is acquired by the information processing apparatus 100 in the second job, is transmitted to and stored in the management server 300. In a case where the image processing apparatus is used as the information processing apparatus 100, processing, such as print out of information of the acquired processing result, may be performed.

Further, in the operation example described with reference to FIGS. 7 to 9, in a case where the interrupted second job is restarted, the transfer of the processing result is restarted from the interrupted spot. On the other hand, in the second job performed after the connection between the information processing apparatus 100 and the processing execution server 200 is restored, the interrupted spot may not be specified and all the processing results may be transferred normally. By doing so, progress of transmission of the processing result does not need to be managed in the information processing apparatus 100 or the processing execution server 200.

Further, in the operation example described with reference to FIGS. 7 to 9, description focuses on the transmission operation of one processing result. On the other hand, in a case where the transmission of the processing results based on the plurality of first jobs is interrupted or non-transmission occurs because the connection between the information processing apparatus 100 and the processing execution server 200 is disconnected, the information processing apparatus 100 may specify transmission order of the plurality of processing results after the connection is restored, or may selectively request transmission of only a part of the processing results among the plurality of processing results. In addition, various changes and substitutions of configurations that do not depart from the scope of the technical idea of the present invention are included in the present invention.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
perform connection to an external server that can be connected from the information processing apparatus, transmit data to be processed to the external server as a first job, and instruct the external server to execute processing of the first job, and then release a resource used in the first job;
make an inquiry about whether or not the processing is completed to the external server, and wait for a response from the external server, wherein the processor is configured to: make the inquiry to the external server by long polling in a case that the external server cannot access the image processing apparatus;
in a case where a response indicating that the processing by the external server is completed is received in response to the inquiry, execute a second job to acquire data of a processing result for the data to be processed, which is transmitted to the external server in the first job, wherein the second job is different from the first job and is cooperated with the first job; and
in a case where a connection between the information processing apparatus and the external server is disconnected before or during the execution of the second job, make the inquiry about whether or not the processing is completed to the external server again and wait for a response from the external server.

2. The information processing apparatus according to claim 1, wherein the processor is configured to:
in the case where the connection between the information processing apparatus and the external server is disconnected during the execution of the second job, execute processing from processing, which is interrupted in the previous second job in the second job to be executed after the inquiry is executed again.

3. The information processing apparatus according to claim 2, wherein the processor is configured to:
in a case where an operation of receiving data from the external server is performed in the second job and the connection between the information processing apparatus and the external server is disconnected before the reception is completed, execute processing from the reception of the data, which is interrupted in the previous second job, in the second job to be executed after the inquiry is executed again.

4. The information processing apparatus according to claim 1, wherein the processor is configured to:
in a case where the inquiry to the external server is executed again, notify the external server of information indicating that the inquiry that is already executed is executed again.

5. The information processing apparatus according to claim 1, wherein the processor is further configured to:
take over an execution authority of another second job related to another first job executed by another information processing apparatus;
make the inquiry about whether or not the processing of the another first job is completed to the external server based on the execution authority, and wait for the response from the external server; and
in a case where the response indicating that the processing of the another first job by the external server is completed is received in response to the inquiry, execute the another second job.

6. The information processing apparatus according to claim 5, wherein the processor is configured to:
in a case where the inquiry is made based on the execution authority of the another second job taken over from the other information processing apparatus, notify the external server of information indicating that the inquiry already executed by the other information processing apparatus is executed again.

7. The information processing apparatus according to claim 1, wherein the processor is configured to:
in the case where the response indicating that the processing by the external server is completed is received in response to the inquiry,
the processor is configured to send a processing result transmission request to the external server, together with a job ID acquired in the first job, and receive the processing result corresponding to the job ID from the external server returns in response to the processing result transmission request.

8. The information processing apparatus according to claim 1, wherein
in a case that additional information is added to the processing result received from the external server,
the processor is further configured to:
execute processing for the processing result based on the acquired additional information.

9. The information processing apparatus according to claim 8, wherein the additional information is storage destination information, and the processor is further configured to transmit the processing result to a storage destination based on the storage destination information.

10. An information processing system comprising:
an information processing apparatus; and
a server,
wherein the information processing apparatus transmits data to be processed to the server as a first job, makes an inquiry about whether or not processing is completed to the server, and waits for a response from the server, wherein the information processing apparatus is configured to: make the inquiry to the server by long polling in a case that the server cannot access the image processing apparatus;
in a case where a response indicating that the processing by the server is completed is received in response to the inquiry, acquires data of a processing result for the data to be processed, which is transmitted to the server in the first job, as a second job different from the first job, and
in a case where a connection between the information processing apparatus and the server is disconnected before or during the execution of the second job, makes the inquiry about whether or not the processing is completed to the server again and waits for a response from the server, and the server
acquires the data to be processed from the information processing apparatus and executes processing for the data,
makes the response indicating that the processing is completed in response to the inquiry from the information processing apparatus, and
transmits the data of the processing result to the information processing apparatus on a request from the information processing apparatus after the response.

11. The information processing system according to claim 10,
wherein, in a case where the connection between the information processing apparatus and the server is disconnected before the transmission of the data of the processing result is completed, the server executes transmission of the data from a part at which the transmission is interrupted in the previous transmission, in transmission of data restarted on a request from the information processing apparatus after responding to re-execution of the inquiry.

12. The information processing system according to claim 10,
wherein, in a case where the server accepts an inquiry about processing for the data to be processed, which is received from the information processing apparatus, from another information processing apparatus having an authority to receive the data of the processing result, the server responds to the inquiry from the other information processing apparatus, and transmits the data of the processing result to the other information processing apparatus in response to a request from the other information processing apparatus after the response.

13. A non-transitory computer readable medium storing a program causing a computer to execute a process comprising:
performing connection to an external server that can be connected from the information processing apparatus, transmitting data to be processed to the external server as a first job, and instructing the external server to execute processing of the first job, and then releasing a resource used in the first job;
making an inquiry about whether or not the processing is completed to the external server, and waiting for a response from the external server, wherein making the inquiry to the external server by long polling in a case that the external server cannot access the image processing apparatus;
in a case where a response indicating that the processing by the external server is completed is received in response to the inquiry, executing a second job to acquire data of a processing result for the data to be processed, which is transmitted to the external server in the first job, wherein the second job is different from the first job and is cooperated with the first job; and
in a case where a connection between the information processing apparatus and the external server is disconnected before or during the execution of the second job, making the inquiry about whether or not the processing is completed to the external server again and waiting for a response from the external server.

14. The non-transitory computer readable medium according to claim 13, wherein the program causing the computer to execute the process further comprising:
in the case where the response indicating that the processing by the external server is completed is received in response to the inquiry,
sending a processing result transmission request to the external server, together with a job ID acquired in the first job, and receive the processing result corresponding to the job ID from the external server returns in response to the processing result transmission request.

15. The non-transitory computer readable medium according to claim 13, wherein the program causing the computer to execute the process further comprising:
in a case that additional information is added to the processing result received from the external server, executing processing for the processing result based on the acquired additional information.

16. The non-transitory computer readable medium according to claim 15, wherein the program causing the computer to execute the process further comprising:
in a case that the additional information is storage destination information, transmitting the processing result to a storage destination based on the storage destination information.

* * * * *